United States Patent
Reynolds

(10) Patent No.: US 7,338,215 B2
(45) Date of Patent: Mar. 4, 2008

(54) CABLE TERMINATION

(75) Inventor: Alan Reynolds, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 7 days.

(21) Appl. No.: 11/077,808

(22) Filed: Mar. 9, 2005

(65) Prior Publication Data

US 2006/0204181 A1    Sep. 14, 2006

(51) Int. Cl.
*G02B 6/36* (2006.01)
(52) U.S. Cl. .................. 385/76; 385/86; 385/139
(58) Field of Classification Search ............ 385/76, 385/86, 139
See application file for complete search history.

(56) References Cited

U.S. PATENT DOCUMENTS

| | | | | |
|---|---|---|---|---|
| 3,307,589 A | * | 3/1967 | Sheffield | 138/109 |
| 3,675,184 A | * | 7/1972 | Vetter | 439/462 |
| 4,721,355 A | * | 1/1988 | Gould | 385/76 |
| 5,485,745 A | * | 1/1996 | Rademaker et al. | 73/152.39 |
| 5,659,651 A | * | 8/1997 | Watanabe | 385/138 |
| 5,877,426 A | * | 3/1999 | Hay et al. | 73/733 |
| 6,145,597 A | * | 11/2000 | Kobylinski | 166/384 |
| 6,439,055 B1 | * | 8/2002 | Maron et al. | 73/705 |
| 6,520,687 B2 | * | 2/2003 | Wong | 385/76 |
| 6,571,046 B1 | * | 5/2003 | Hickey et al. | 385/134 |
| 6,703,635 B2 | * | 3/2004 | Yashiro et al. | 250/577 |
| 2002/0146212 A1 | * | 10/2002 | Wong | 385/76 |

* cited by examiner

*Primary Examiner*—Ellen E. Kim
(74) *Attorney, Agent, or Firm*—The H.T. Than Law Group

(57) ABSTRACT

An optical cable termination includes a termination body and a pressure test section. The pressure test section includes a body configured to be press fit, screwed or otherwise attached to an end of the termination body and at least one test port. The pressure test section allows for testing of the seal integrity of the termination at pressure prior to deployment. Optionally included with the termination is a boot seal having at least one tubular protrusion extending from a boot seal body, wherein the boot seal body is configured to receive an end of the fiber optic cable and then at least one tubular protrusion is configured to allow at least one optical fiber to extend therethrough. When using the boot seal, the termination also optionally includes an anti-extrusion plate disposed within the boot seal body, wherein the anti-extrusion plate is configured to allow at least one optical fiber to extend therethrough. A compression seal is also included between the termination body and pressure test section to seal directly onto the hermetic cable. The compression seal and pressure test section are also adapted to a Y-splice and a wellhead termination.

20 Claims, 9 Drawing Sheets

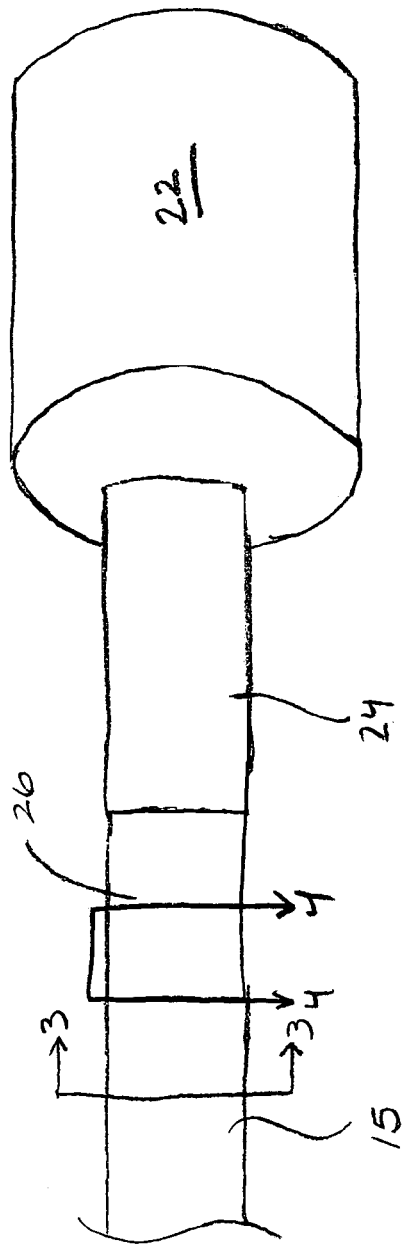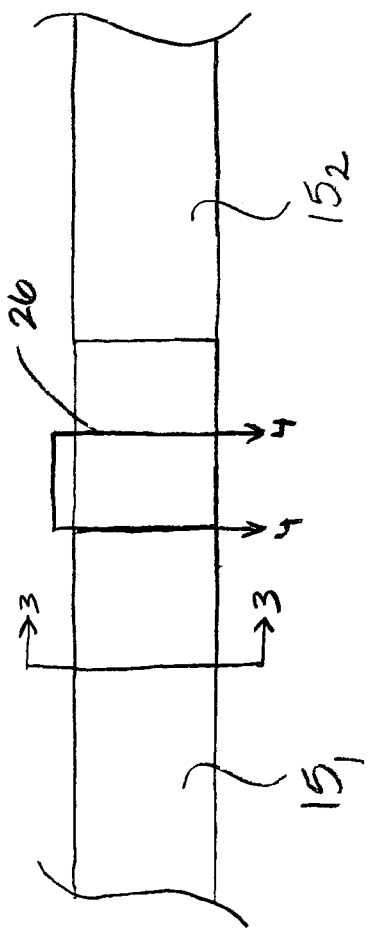

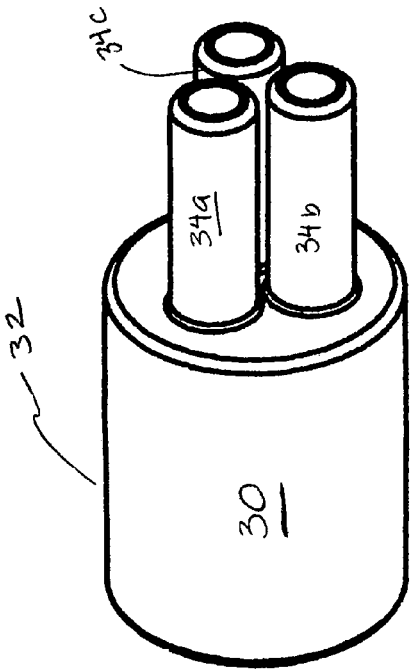
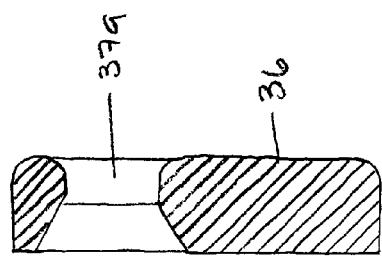
FIG. 5
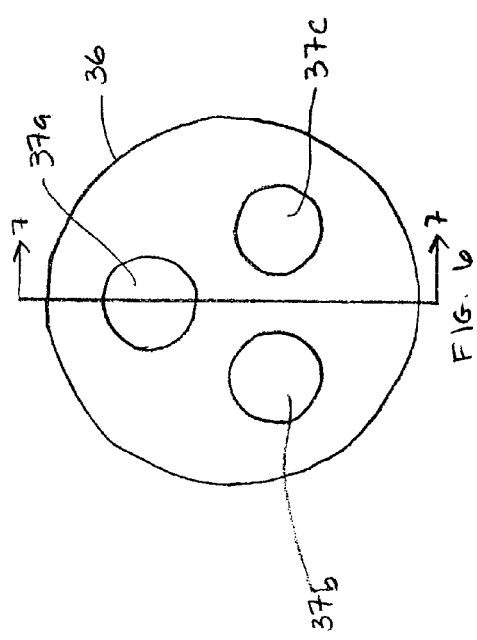
FIG. 7
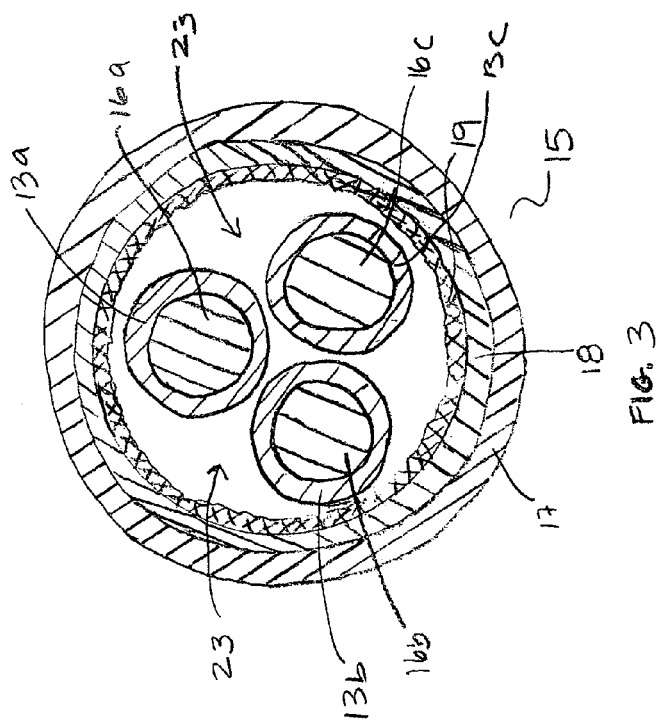
FIG. 3
FIG. 6

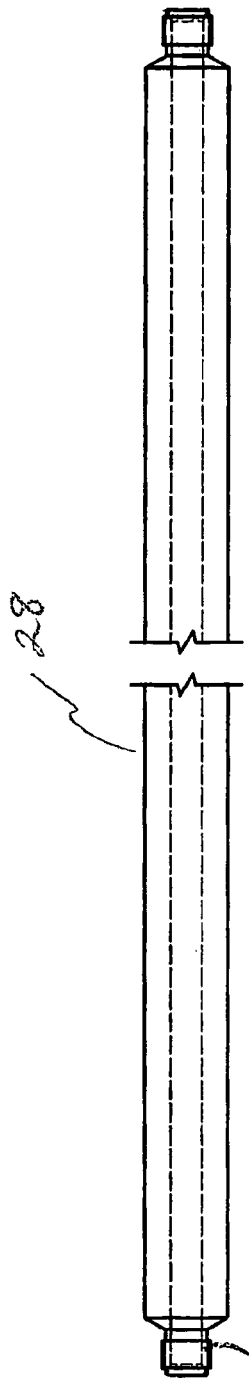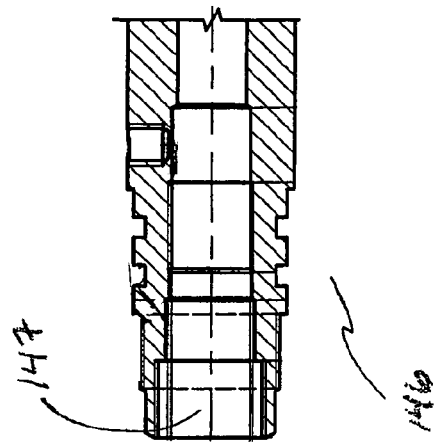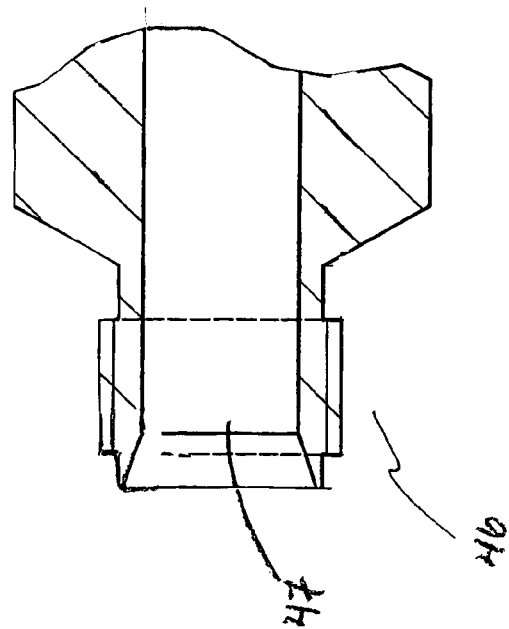

CABLE TERMINATION

FIELD OF THE INVENTION

This invention generally relates to devices for connecting and sealing cables. More particularly the present invention relates to devices for splicing and sealing hermetic cables in harsh environments.

BACKGROUND OF THE INVENTION

As oil and gas recovery becomes more and more complex the necessity to measure, monitor and control the oil or gas well in every sense becomes more important from a production optimization, safety and cost point of view.

Important parameters often required by the industry are pressure, temperature, flow rate, etc., either during drilling or after the well is completed. Electrical and fiber optic based systems can provide this information. Fiber optic systems have the advantage of being relatively immune to temperature and electromagnetic influences and are thus viewed as more reliable—especially when deployed in harsh environments. As a result, in the petroleum and gas industry, passive fiber optic sensors are often used to obtain various downhole measurements, such as, pressure or temperature. For example, a string of optical fibers within a fiber optic system may be used to communicate information from wells. In such a case, downhole measurements may be obtained from optical gauges and/or sensors such as for example Fabry-Perot sensors. Typically, a well may require 1, 2 or more gauges or sensors to measure well parameters along the full depth of the well or concentrated in certain areas.

Additionally, in more complex completions, wells often have downhole moving parts such as valves that may be opened or closed to control flow based on the information provided by the above. These devices are typically hydraulic, although electrical systems also exist. Hydraulic control systems need to be deployed in the wells on site in order to work the downhole moving parts. Hydraulic channels and fittings are typically assembled and tested just prior to insertion into the well from sections of tubing and interchangeable fittings.

When these optical, electrical and/or hydraulic systems are deployed in a well, either inside the tubing, inside the annulus or outside the casing, these systems need to be protected from the harsh well environment. This protection is typically achieved by encasing the fiber optic, electrical conductor or hydraulic channel in a hermetic cable. The complexity and precise configuration of this cable will depend on the specific needs associated with the particular well. In the case of hydraulic lines, the cable is essentially a tube. However, in the case of electrical, optical, or hybrid cables the internal configurations of the hermetic cable may be very complex containing multiple fibers and/or electrical conductors.

When deploying sensors or hydraulic systems in a well, the system is typically built onsite just prior to insertion into the well so that the system may be customized to the needs of the well. To build these custom systems, the hermetic cable(s) are cut so that the appropriate sensors or hydraulic components may be added to the systems. When joined, the performance and integrity of the joint needs to mirror the performance and integrity of the original cable in terms of transmissivity and protection against the harsh well environment.

The joining of cable-to-cable or cable-to-gauge is often achieved by means of a splice. These points of attachment are susceptible to the extreme pressure, temperature, and chemical environmental conditions within a well. Therefore, the splice needs to be configured such that the hermetic nature of the cable may be re-established. This also means the seals used need to be testable for sealing integrity.

In addition, during deployment, accidental severing of the cable(s) may sometimes occur. To minimize delays in deployment the splice needs to be relatively simple and quick to complete in an oil field environment before deployment. Such splices may also be configured to act as wellhead feedthroughs, packer penetrators, and safety valve penetrators as identified by the well completion.

Therefore, a need exists in the art for a splice that can be deployed quickly. Furthermore, a need exists to be able to test the integrity of the splice prior to exposure to extreme conditions.

SUMMARY OF THE INVENTION

The present invention is directed to an optical cable splice including a termination body and a pressure test section. The pressure test section includes a body configured to be removably attached to an end of the termination body and at least one test port. Additionally, a compression seal is disposed between the pressure test section and the termination body.

Another aspect of the invention is directed toward an optical Y-splice that includes a Y-piece having three optical terminations removably attached thereto. Each termination includes a termination body and a pressure test section. The pressure test section includes a body configured to be removably attached to an end of the termination body and at least one test port. Additionally, a compression seal is disposed between the pressure test section and the termination body.

Another aspect of the invention is directed toward an optical wellhead feedthrough comprising a termination sleeve, a secondary seal disposed within an end of the termination sleeve, a connector attached to a second end of the termination sleeve, wherein the connector is configured to removably connect the termination sleeve to a piece of surface equipment, and a pressure test section. The pressure test section includes a body configured to be removably attached to an end of the termination body and at least one test port. Additionally, a compression seal is disposed between the pressure test section and the termination body.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is a schematic view of an embodiment of a splice joining two sections of a hermetic cable according to the present invention;

FIG. 2 is a schematic view of the splice of FIG. 1 joining a hermetic cable with a gauge;

FIG. 3 is a cross-sectional view of a fiber optic cable taken along line 3-3 of FIGS. 1 and 2;

FIG. 5 is an enlarged isometric view of a boot seal according to the embodiment shown in FIG. 4;

FIG. 6 is a front view of an anti-extrusion plate according to the embodiment shown in FIG. 4;

FIG. 7 is a cross-sectional view of the anti-extrusion plate taken along line 7-7 of FIG. 6;

FIG. 9 is a planar view of a splice body according to an embodiment of the present invention;

FIG. 10A is an enlarged cross-sectional view of an end of the splice body shown in FIG. 9;

FIG. 10B is an enlarged cross-sectional view of an alternate embodiment of an end of the splice body shown in FIG. 9;

DETAILED DESCRIPTION OF THE PREFERRED EMBODIMENTS

Figure 4:
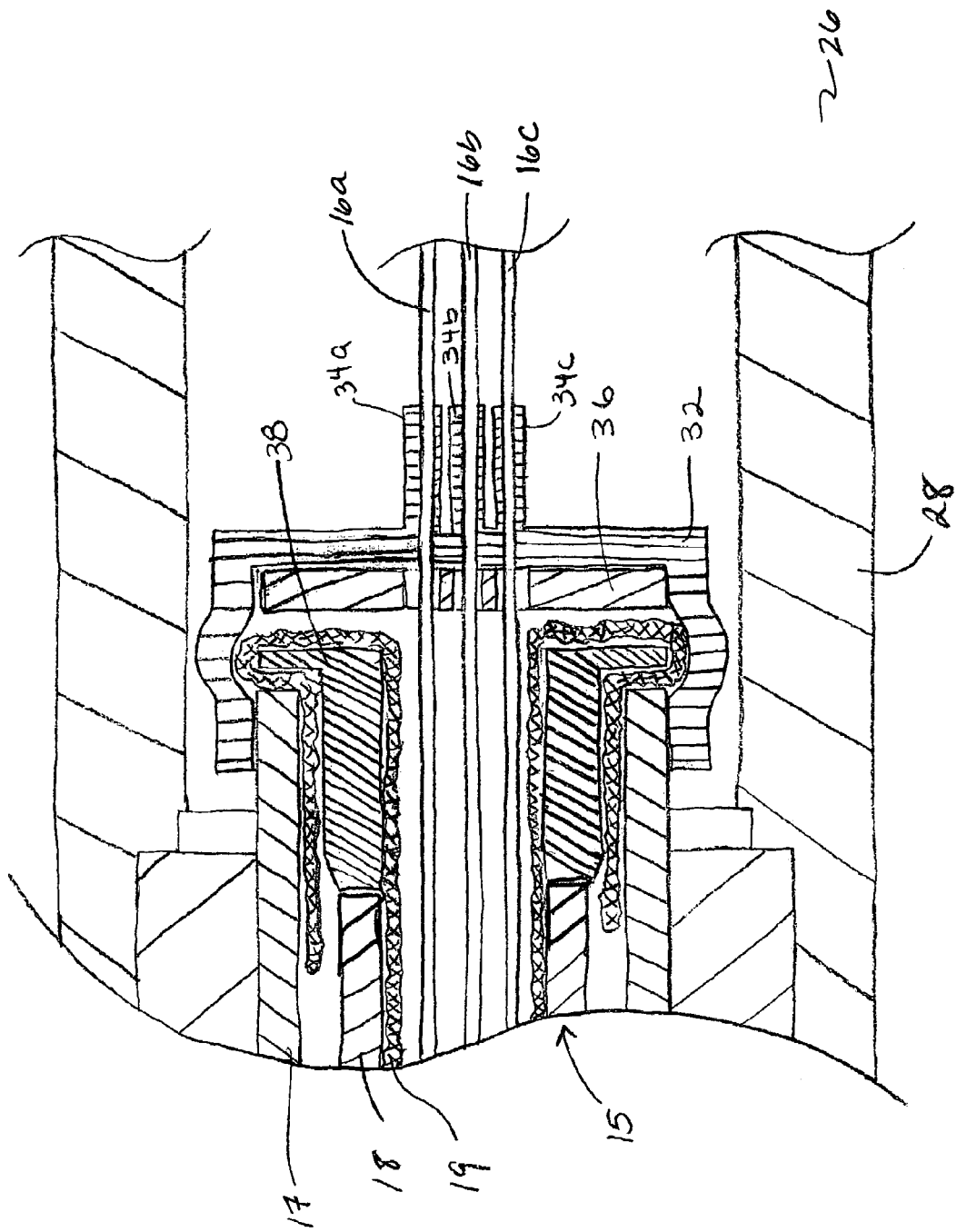
FIG. 4 is a cross-sectional view of a boot seal configuration taken along line 4-4 of FIGS. 1 and 2.

As illustrated in the accompanying drawings and discussed in detail below, the present invention is directed to a splice 26 for joining together sections $15_1$, $15_2$ of hermetic cables 15, as shown in FIG. 1, or equipment such as gauges or sensors 22 via optional cable extension 24 and with hermetic cables 15, as shown in FIG. 2.

The structure of splice 26 is chosen to be compatible with hermetic cable 15. Hermetic cable 15 is any type of hermetic cable known in the art, such as those used in the oil and gas industry that, when joined, need to re-acquire the full hermetic nature of the cable prior to cutting or terminating so as to withstand the harsh environment inside and surrounding a well. As shown in FIG. 3 for the purposes of example only, hermetic cable 15 preferably includes at least three filaments 16a-c encased within an outer jacket 17, an inner tube 18, and a braid 19. Additionally, each filament 16a-c is preferably encased in a buffer tube that is preferably made of a polymer such as polybutylene terephthalate (PBT), although any material known in the art is also appropriate. Filaments 16a-c may be any type of communication medium known in the art, such as single mode or multi-mode optical fibers or electrical conductors such as copper or other alloys or any combination thereof. It will be appreciated by those in the art that any number of filaments 16 may be included in hermetic cable 15, such as 1, 2, or more, depending upon the intended use of hermetic cable 15, for example, transmitting information over various channels, powering downhole equipment or measuring downhole characteristics. Alternatively, as will be apparent to those skilled in the art, no filaments 16 may be provided, for example, when hermetic cable 15 houses hydraulic channels and fittings. The three filaments 16 are shown for clarity and illustration only.

Outer jacket 17 is preferably a hermetic tube, such as a tube made of stainless steel, aluminum, polymer, or similar material as known in the art configured to withstand the pressures experience in industry to which it is applied. Inner tube 18 is preferably a thermo-plastic material for example polypropylene that free-floats within outer jacket 17. Braid 19 is preferably a woven high tensile strength material such as Kevlar® or a non-wicking yarn. It will be appreciated by those in the art that inner tube 18 and braid 19 may be omitted in many circumstances and are shown here for the purposes of example only to show the structure of a typical optical hermetic cable. In other examples, such as for electrical cables or alternate optical cables, these structures may be replaced with tight buffers and/or insulation.

As shown in FIG. 4, splice 26 includes a splice body 28 and is configured to seal hermetic cable 15 utilizing a boot seal 32 and, preferably, an anti-extrusion plate 36. Boot seal 32 is also shown in FIG. 5. Boot seal 32 includes a main body 30 and at least one boot seal tubular extension 34a-c. Boot seal 32 includes sufficient boot seal tubular extensions 34a-c to equal the number of filaments 16a-c included within hermetic cable 15. Boot seal main body 30 is preferably a flexible cylindrical member having an inner diameter that is approximately equal to or slightly less than the outer diameter of outer jacket 17. Boot seal main body 30 is configured to receive outer jacket 17 within its interior and to form a snug seal therearound. In other embodiments, boot seal main body may be configured to form a snug seal around filaments 16a-c directly or around additional protective jackets. Similarly, boot seal tubular extensions 34a-c are preferably flexible cylindrical members having an inner diameter that is approximately equal to or slightly less than the outer diameter of buffer tubes 13a-c. Boot seal tubular extensions 34a-c are configured to allow buffer tubes 13a-c to pass through boot seal tubular extensions 34a-c for a transmissive, i.e., optical, electrical or hydraulic connection to another length of cable 15. Each individual filament 16 with all of its protective jackets such as buffer tubes 13 passes through one tubular extension. For example, as shown in FIG. 4, filament 16a and buffer tube 13a pass through boot seal extension 34a, filament 16b and buffer tube 13b pass through boot seal extension 34b, and filament 16c and buffer tube 13c pass through boot seal extension 34c. Boot seal 32 is preferably made of an elastomeric or rubber based material, but any similar material capable of forming a gasket-like seal around the end of hermetic cable 15 when subjected to pressure may also be used.

Disposed within boot seal 32 between the end of hermetic cable 15 and boot seal tubular extensions is optional anti-extrusion plate 36. Also shown in FIG. 6, anti-extrusion plate 36 is preferably a disk of a strong and stiff material, such as stainless steel, plastic or aluminum. Anti-extrusion plate 36 provides a barrier so that, under pressure, boot seal 32 is pressed against anti-extrusion plate 36 and is prevented from being extruded into interstitial spaces 23. Holes 37a-c are positioned through anti-extrusion plate 36 so as to correspond to the number and configuration of buffer tubes 13a-c and filaments 16a-c included within hermetic cable 15. As shown in FIG. 4, anti-extrusion plate 36 is positioned within boot seal 32 such that one buffer tube 13 and filament 16 passes through a corresponding hole 37. For example, buffer tube 13a and filament 16a passes through hole 37a, buffer tube 13b and filament 16b passes through hole 37b, and buffer tube 13c and filament 16c passes through hole 37c. Under the anticipated pressures experienced by hermetic cable 15 at depth within or surrounding a well, the relatively soft material of boot seal 32 may be forced into the interstitial spaces 23, shown in FIG. 3, between buffer tubes 13a-c in hermetic cable 15. As shown in FIG. 7, holes 37a-c preferably include rounded and tapered edges, so that passing buffer tubes 13a-c and filaments 16a-c may be passed therethrough easily. The inner diameters of holes 37a-c are chosen for each cable configuration, and are preferably the minimum size to allow buffer tubes and filaments to pass therethrough without damage.

Figure 8:
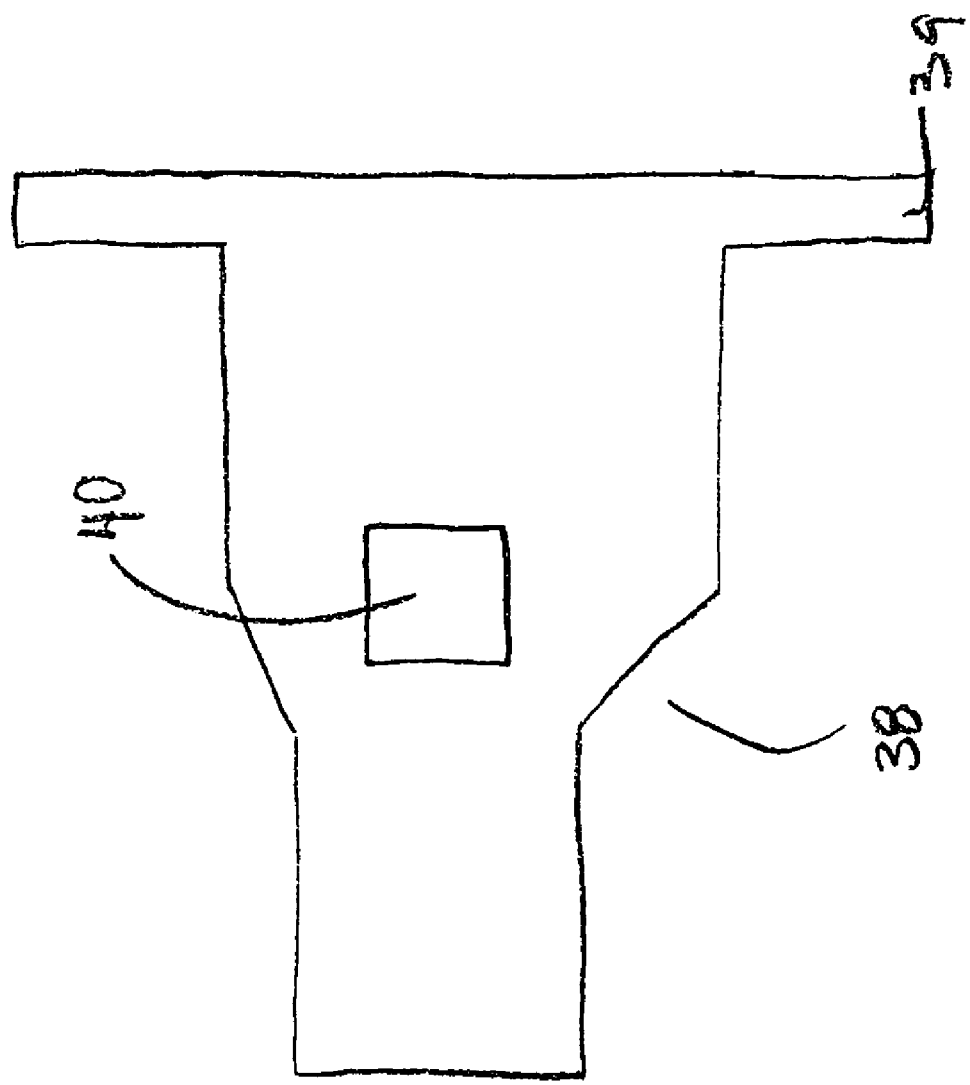
FIG. 8 is a side view of an alternate embodiment of a braid anchor according to the present invention.

Prior to deployment, hermetic cable 15 is typically coiled, such as around a spool or reel, for transportation. During the winding process, outer jacket 17 winds with a slightly different radius of curvature than inner tube 18 due to differences in material and diameter. If inner tube 18 is not affixed within outer jacket 17, i.e., hermetic cable 15 is of a loose tube configuration, inner tube 18 is displaceable lengthwise with respect to outer jacket 17. When hermetic cable 15 is unwound and cut, inner tube 18 may slide backwards into outer jacket 17. In the art, this is commonly known as "suckback". To help prevent suckback, splice 26 also preferably includes a braid anchor or braid lock 38, shown in FIGS. 4 and 8. Braid anchor 38 is preferably a rigid, generally cylindrical member made from a material such as metal or plastic configured to be inserted into the open end of hermetic cable 15. Braid anchor 38 also includes a rim portion 39. Braid 19 is then folded over and held in place against outer jacket 17 by rim portion 39 of braid anchor 38. As shown in FIG. 4, preferably inner tube 18 is cut slightly shorter than the rest of hermetic cable 15. Braid anchor 38 is inserted into hermetic cable so that it butts up against the end of inner tube 18. As shown in FIG. 8, braid anchor 38 may also include a window 40 through which braid 19 may be threaded prior to inserting braid anchor 38 into the open end of hermetic cable 15 for a more secure hold. In this case, braid 19 is trapped only between the cylindrical body of braid anchor 38 and the inner surface of outer jacket 17. Rim portion 39 is used in this example to prevent braid anchor 38 from being drawn into hermetic cable 15. Trapping braid 19 against outer jacket 17 in this fashion prevents inner tube 18 from lengthwise displacement with respect to outer jacket 17.

Referring now to FIG. 9, splice body 28 is shown in greater detail. Splice body 28 is a relatively smooth and continuous tubular member, preferably made of a metal such as stainless steel although other rigid materials known in the art including but not limited to thermoplastics and aluminum may also be used. At either end of splice body 28 is preferably a head 46 configured to be attached to a pressure test section, which is discussed in greater detail below with respect to FIG. 11. FIG. 10A shows a first embodiment of head 46, which is a relatively smooth, generally hexagonal outer surface. It will be understood by those in the art that the exterior surface may have many configurations and is not limited to hexagonal. An interior cavity 47 is configured to receive a dual metal compression seal or multiplicity thereof, which is discussed in greater detail below with respect to FIG. 11. FIG. 10B shows a second embodiment of head 46, which includes several grooves on the exterior surface thereof to receive sealing members, such as rubber O-rings or similar deformable gaskets. When splice 26 is attached to hermetic cable 15, these sealing members will be compressed to create a pressure tight seal.

Figure 11:
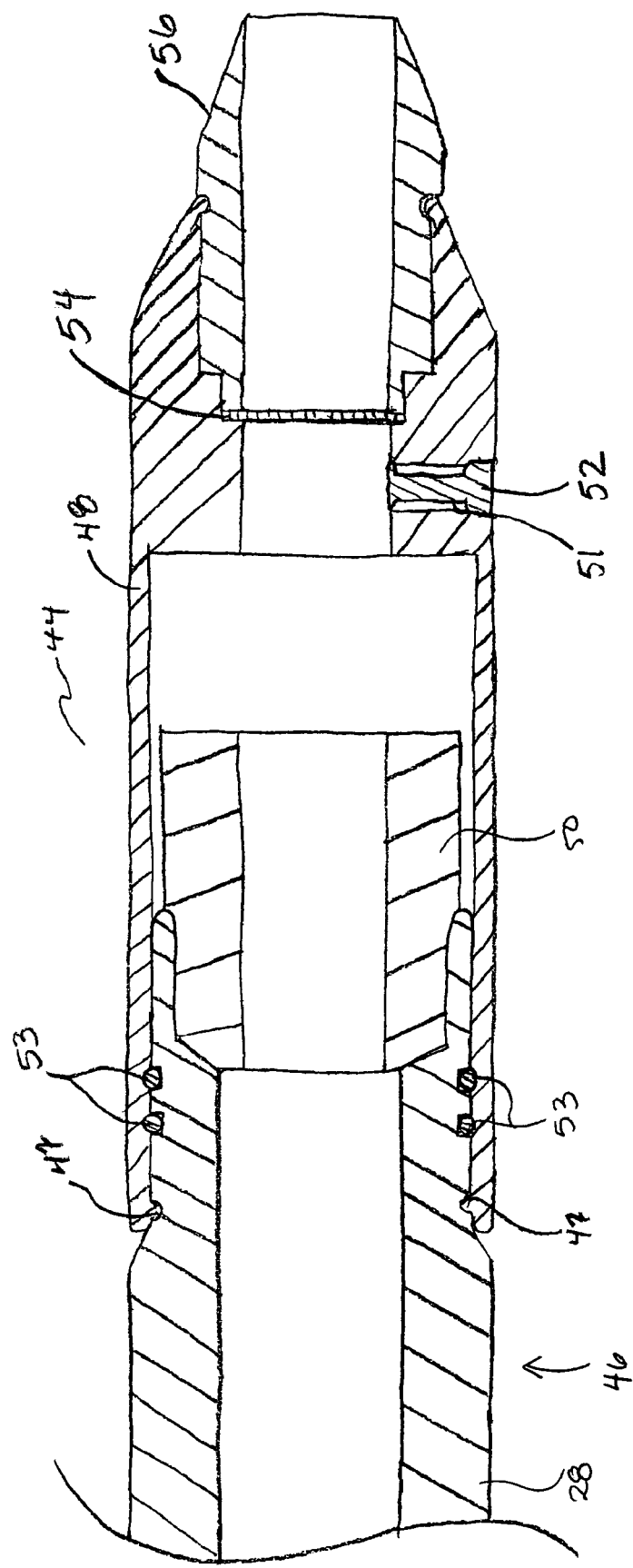
FIG. 11 is a lengthwise cross-sectional view of a pressure test section for according to an embodiment of the present invention.

As shown in FIG. 11, splice 26 also preferably includes a pressure test section 44 disposed on at least one head 46 of splice 26. Pressure test section 44 allows an installer to verify the integrity of the pressure seals within splice 26 prior to actual deployment. Pressure test section 44 includes a test section housing 48 configured to receive end 46 of splice housing 28. Preferably, test section housing 48 is screwed onto the splice housing 28, although any method known in the art for attaching test section housing 48 to splice housing 28 may be used. Additionally, one or more O-rings, gaskets or similar sealing members 53 may be included to seal the joint between test section housing 48 and head 46.

Test section 44 is preferably additionally sealed with respect to head 46 using a solid compression fit seal 50 or multiplicity thereof. For example, compression fit seal 50 may be a metal slug configured to fit snugly and seal within head 46 of splice housing 28 or a threaded metal piece that screws onto or into head 46. A second end of test section housing 48 is preferably sealed with a rubber O-ring or similar deformable gasket 54 that is loaded with a member 56. Member 56 is preferably a screw, but may also be any type of connection device known in the art that is capable of deforming gasket 54 to form a tight seal to close pressure test section 44.

A pressure test port 51 extends through a sidewall of test section housing 48. Pressure test port 51 is closed with a removable blanking plug 52. Plug 52 is preferably manufactured from the same material as the test section housing 48. Alternatively, the blanking plug may be a non-removable stopper manufactured from materials suitable for the oil field environment configured to be a press fit within test port 51. Prior to fitting plug 52 the integrity of the seals of splice 26 are tested by a pressure source and gauge (not shown) being inserted within test port 51. The pressure source may be any type known in the art, such as hydraulic or pneumatic. The gauge may also be any type known in the art, such as dial gauges, electronic gauges, or water manometers. Test section housing 48 is then pressurized using the pressure source. The test pressure may range from the relatively low compared with the anticipated pressure, such as one atmosphere, to the approximate environmental pressure in use, or even up to twice the system rated pressure. The gauge monitors the pressure within test section housing 48 for a specific duration. If the pressure within splice 26 does not fall for the duration of the test, the integrity of the seals within test section housing 48 is confirmed. If the pressure does fall, then a leak may be indicated and repaired prior to deployment of hermetic cable 15. On removal of the leak test equipment port 51 is sealed with plug 52 prior to deployment.

Figure 12:
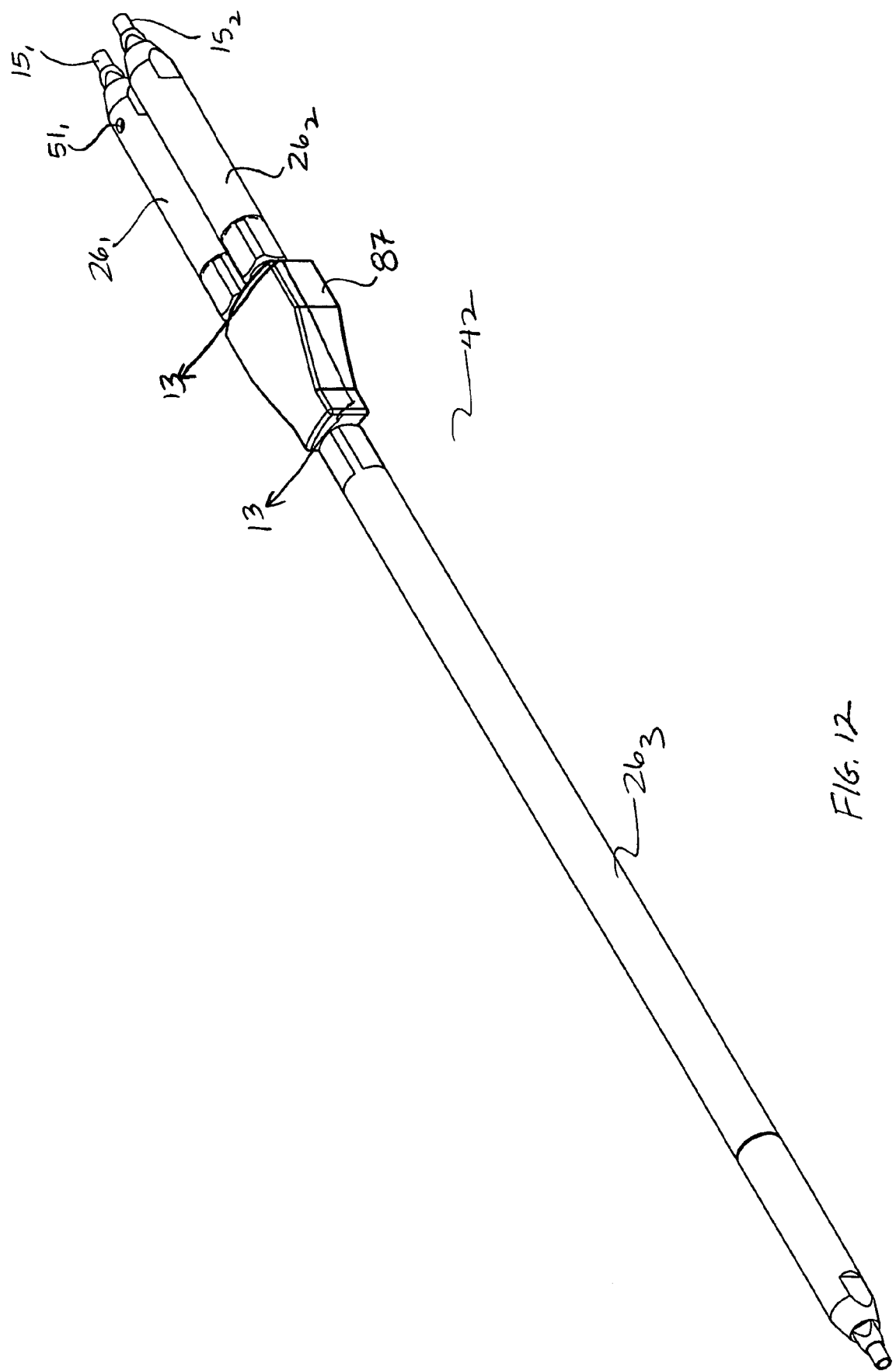
FIG. 12 is a isometric view of a fiber optic cable with a Y-splice according to an embodiment of the present invention.
Figure 13:
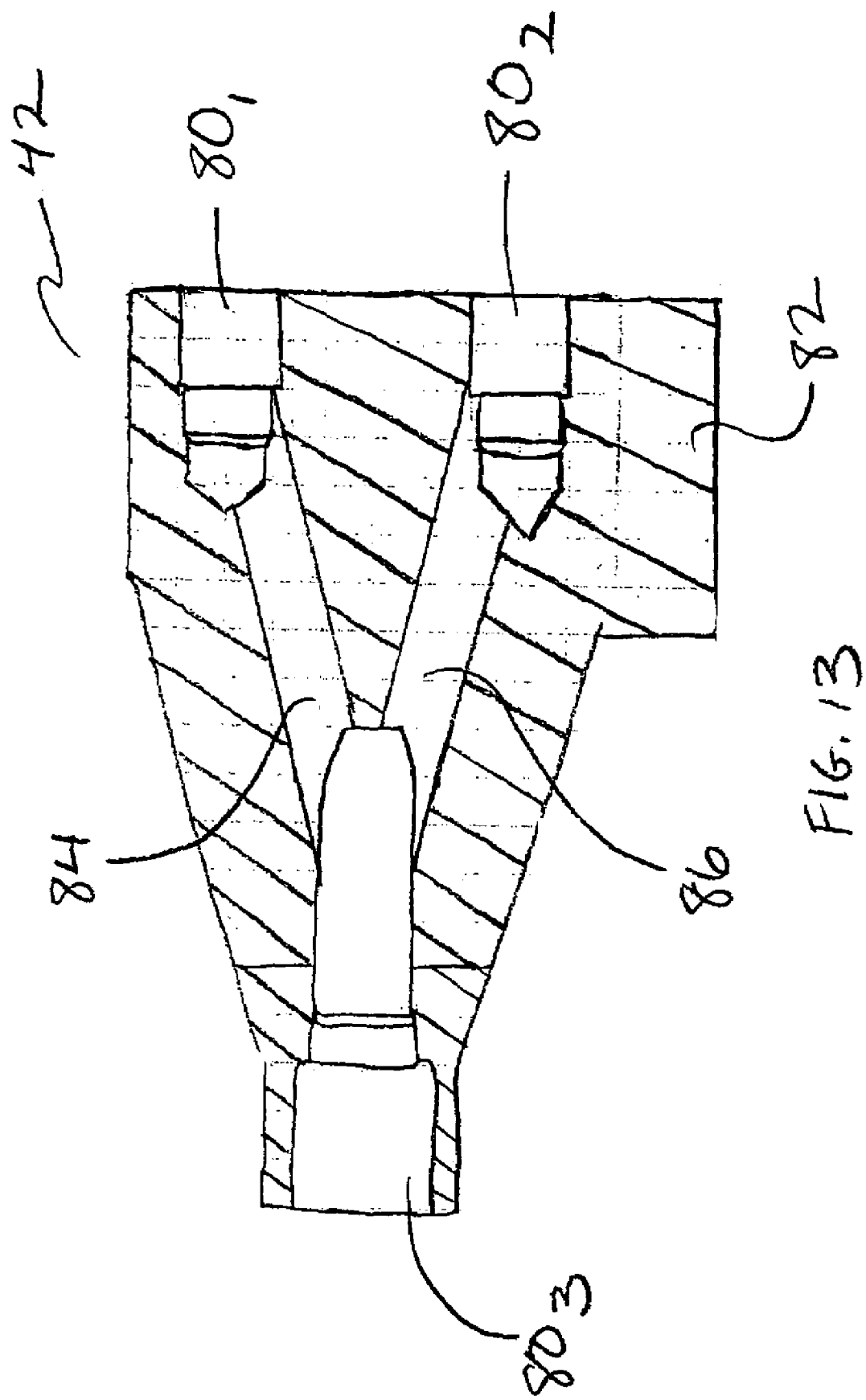
FIG. 13 is an enlarged cross-sectional view of the Y-piece shown in FIG. 12 taken along line 13-13 thereof.

It will be readily recognized by those in the art that pressure test section 44 may be utilized in other cable termination devices in addition to splice 26. For example, as shown in FIG. 12, two hermetic cables $15_1$ and $15_2$ are connected to a single trunk cable $15_3$ using a Y-splice 42. Y-piece 87, shown FIG. 13, includes a body 82 and three splice sections $26_1$, $26_2$, and $26_3$ for receiving hermetic cables $15_1$, $15_2$, and $15_3$, respectively. Splice sections $26_1$, $26_2$, and $26_3$ are preferably configured to be inserted into ports $80_1$, $80_2$, and $80_3$, respectively. Y-piece 87 provides pathways 84 & 86 to permit buffer tubes 13 and filaments 16 in hermetic cables $15_1$ and $15_2$ to pass therethrough to connect to buffer tubes 13 and filaments 16 in hermetic cable $15_3$. If cables $15_{1-3}$ are optical, it will be recognized by those in the art that pathways 84, 86 may simply be optical routing paths.

Splice sections $26_1$, $26_2$, and $26_3$ are preferably structurally similar to splice 26 discussed above with respect to FIG. 4. Each splice section $26_1$, $26_2$, and $26_3$ includes a pressure test section similar to pressure test section 44. Furthermore, the entry of each splice section $26_1$, $26_2$, and $26_3$ into Y-piece 87 in ports $80_1$, $80_2$, and $80_3$, respectively, are also optionally capable of being configured for testing as in pressure test section 44. In FIG. 12, only test port $51_1$ is visible, although the structure and method for testing seal integrity is essentially the same as discussed above with respect to FIG. 11.

It will be readily recognized by those in the art that a multiplicity of channels may be generated in Y-piece 87 to accommodate a multiplicity of hermetic cables $15_{1-n}$.

Figure 14:
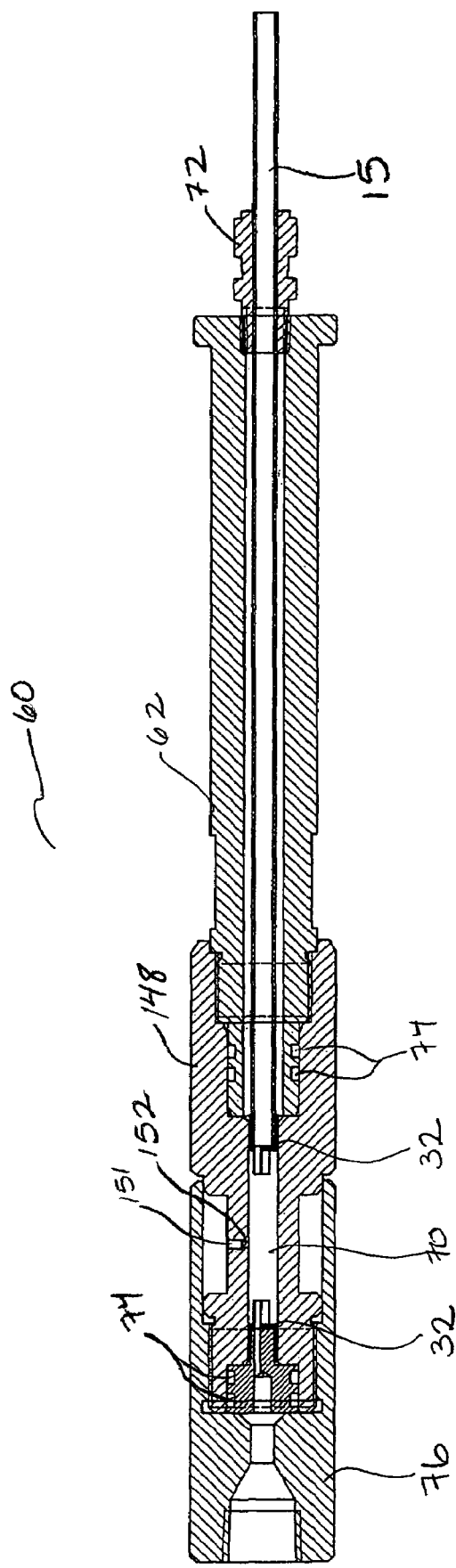
FIG. 14 is a lengthwise cross-sectional view of a wellhead termination sleeve according to an embodiment of the present invention.

The seals shown in splice 26 as discussed above with respect to FIG. 4 and the pressure test section 44 as discussed above with respect to FIG. 11 may also be adapted to a wellhead feedthrough 60 as shown in FIG. 14. Wellhead feedthrough 60 is configured to seal hermetic cable 15 at the entry/egress point on a surface wellhead. Referring to FIG. 14, wellhead feedthrough 60 includes a sleeve body 62, which is a generally cylindrical member configured to receive at one end a secondary seal 72. The opposite end of sleeve body 62 is configured to be inserted into a first end of pressure test housing 148, which is similar to pressure test housing 48 described above with respect to FIG. 11 and defines a pressure test cavity 70. This joint is preferably sealed using rubber O-rings 74 or similar gaskets. A connector 76 is configured on one end to be attached to a hermetic cable 15, conduit or surface cable that extends to surface equipment including, for the purposes of example only, a vent box or a surface interrogation unit and on the other end to be attached to the second end of pressure test housing 148. This joint is also preferably sealed with O-rings 74, and optionally a second boot seal 32 seals the end of a second hermetic cable 15, conduit or surface cable that transmits information to the surface equipment.

Within pressure test housing 148, a first end of cable 15 is optionally sealed using boot seal 32, which is described above with respect to FIGS. 4 and 5. Although not shown, anti-extrusion plate 36 is optionally included as discussed above with respect to FIGS. 4, 6, and 7. A test port 151 and a port plug 152, similar to test port 51 and plug 52 discussed above with respect to FIG. 11, are used to test the integrity of the seals within wellhead feedthrough 60 in the manner discussed above with respect to FIG. 11.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications, configurations, and embodiments which would come within the spirit and scope of the present invention.

What is claimed is:

1. An optical cable splice comprising:
a termination body, wherein an optical fiber or electrical wire is capable of passing therethrough;
a pressure test section comprising a body configured to be removably attached to an end of the termination body and at least one test port;
at least one first deformable sealing member disposed between the pressure test section and the termination body; and
a second compression seal disposed between the pressure test section and the termination body, wherein the first deformable seal and the second compression seal provide a pressure tight seal between the pressure test section and the termination body, and
wherein the first deformable sealing member and the second compression seal cooperate to seal a single potential flow path between the pressure test section and the termination body.

2. The optical cable splice of claim 1, wherein the second compression seal is metal.

3. The optical cable splice of claim 1, wherein the second compression seal is operatively positioned relative to the first deformable sealing member to exert additional pressure on the first deformable sealing member.

4. The optical cable splice of claim 3, wherein the first deformable sealing member is an O-ring.

5. The optical cable splice of claim 1 further comprising a braid anchor having a generally cylindrical body and a rim, wherein the braid anchor is configured to trap a braid of a fiber optic cable connected to the optical cable termination.

6. The optical cable splice of claim 5, wherein the braid anchor is configured to trap the braid of the fiber optic cable between a fiber optic hermetic cable jacket and the cylindrical body of the braid anchor.

7. The optical cable splice of claim 5, wherein the braid of the fiber optic cable is trapped between an outer jacket of the fiber optic cable and the run.

8. The optical cable splice of claim 5, wherein a boot seal covers the trapped portion of the braid.

9. The optical cable splice of claim 5 further comprising a cutout disposed in a sidewall of the braid anchor cylindrical body, wherein the braid is passed through the cutout so that the braid may be trapped between the braid anchor and a cable jacket.

10. The optical cable splice of claim 1 further comprising a boot seal having at least one tubular protrusion extending from a boot seal body, wherein the boot seal body is configured to receive an end of a fiber optic cable and the at least one tubular protrusion is configured to allow at least one optical fiber to extend therethrough.

11. The optical cable splice of claim 10 further comprising an anti-extrusion plate disposed within the boot seal body, wherein the anti-extrusion plate is configured to allow at least one optical fiber to extend therethrough.

12. The optical cable splice of claim 1 further comprising a test pod plug.

13. An optical connector comprising a plurality of optical cable splices, wherein each optical cable splice comprises the elements of the optical cable splice of to claim 1.

14. An optical wellhead feedthrough comprising at least one optical cable splice, wherein said at least one optical cable splice comprises the elements of the optical cable splice of claim 1, wherein said at least one optical cable spice is connected to a sleeve on the wellhead feedthrough.

15. The optical wellhead feedthrough of claim 14 wherein a third compression seal is provided between said at least one optical cable splice and the sleeve to provide a pressure tight seal therebetween.

16. The optical wellhead feedthrough of claim 15 wherein the third compression seal is metal.

17. The optical wellhead feedthrough of claim 16 wherein the third compression seal is a dual metal seal.

18. The optical wellhead feedthrough of claim 14 further comprising a boot seal having at least one tubular protrusion extending from a boot seal body, wherein the boot seal body is configured to receive an end of a cable and the at least one tubular protrusion is configured to allow at least one filament to extend therethrough.

19. The optical wellhead feedthrough of claim 18 further comprising an anti-extrusion plate disposed within the boot seal, wherein the anti-extrusion plate includes at least one hole disposed therethrough to allow at least one filament to extend therethrough.

20. The optical wellhead feedthrough of claim 14 further comprising a braid anchor having a generally cylindrical body and a rim, wherein the braid anchor is configured to trap a braid of a cable.

* * * * *